US006917719B2

(12) United States Patent
Krishnamurthy et al.

(10) Patent No.: US 6,917,719 B2
(45) Date of Patent: Jul. 12, 2005

(54) METHOD AND APPARATUS FOR REGION-BASED ALLOCATION OF PROCESSING RESOURCES AND CONTROL OF INPUT IMAGE FORMATION

(75) Inventors: Ravi Krishnamurthy, Princeton, NJ (US); Sriram Sethuraman, Hightstown, NJ (US); Ya-Qin Zhang, Cranbury, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/317,697

(22) Filed: Dec. 12, 2002

(65) Prior Publication Data

US 2003/0123751 A1 Jul. 3, 2003

Related U.S. Application Data

(63) Continuation of application No. 09/295,526, filed on Apr. 21, 1999, now Pat. No. 6,496,607.
(60) Provisional application No. 60/090,813, filed on Jun. 26, 1998.

(51) Int. Cl.$^7$ .............................. G06K 9/36; H04N 7/14
(52) U.S. Cl. .................................... 382/282; 348/14.01
(58) Field of Search ................................ 382/224, 232, 382/276, 282, 299, 173, 180, 192, 195, 201, 206; 348/14.01, 14.08, 14.1, 27, 14.13

(56) References Cited

U.S. PATENT DOCUMENTS

| | | | | |
|---|---|---|---|---|
| 5,432,871 A | | 7/1995 | Novik .......................... 382/232 |
| 5,550,580 A | | 8/1996 | Zhou ............................ 348/15 |
| 5,594,494 A | * | 1/1997 | Okada et al. ............... 348/14.1 |
| 5,675,374 A | | 10/1997 | Kohda ......................... 348/15 |
| 5,737,011 A | | 4/1998 | Lukacs ........................ 348/15 |
| 5,844,599 A | | 12/1998 | Hildin .......................... 348/15 |
| 5,880,788 A | * | 3/1999 | Bregler ........................ 348/515 |
| 5,909,513 A | * | 6/1999 | Liang et al. ................. 382/253 |
| 5,973,738 A | | 10/1999 | Srivastava ................... 348/395 |
| 6,011,901 A | | 1/2000 | Kirsten ........................ 386/123 |
| 6,023,296 A | | 2/2000 | Lee et al. .................... 348/405 |
| 6,044,115 A | | 3/2000 | Horiike et al. .............. 375/240 |
| 6,583,806 B2 | * | 6/2003 | Ludwig et al. ........... 348/14.08 |

OTHER PUBLICATIONS

Patent Abstracts of Japan, vol. 1997, No. –, Apr. 30, 1997 & JP 08 336505 A 9 Hitachi Medica Corp), Dec. 24, 1996 abstract.

Schumeyer R P et al: "Region of Interest priority coding for sign language videoconferencing" 1997 IEEE First Workshop of Multimedia Signal Processing (Cat. No. 07$^{TH}$8256) Proceedings of First Signal Processing Society Workshop of Multimedia Signal Processing, Princeton, NJ USA Jun. 23–25, 1997, pp. 531–536, XP9002116570 1997, New York, NY, USA, IEEE, USA ISBN: 0–7803–3780–8 p. 533, paragraph 4—p. 534, paragraph 3.

"A Color–Based Classifier for Region Identification in Video", R. Schumeyer and K. Barner, SPIE Proceedings, vol. 3309, Jan. 1999, pp. 189–200.

Vlahakis V, et al: "ROI approach to wavelet–based, hybrid compression of MR images" Sixth International Conference on Image Processing and Its Applications (Conf Publ. No. 433), Proceedings of 6$^{TH}$ International Conference on Image Processing and Its Applications (Conf. Publ. No. 433), Dublin Ireland, Jul. 14–17, 1997, London, UK<IEE, UK ISBN: 0–85296–692–X Abstract p. 834, right–hand column, line 27–line 42 p. 833, right–hand column, line 19–line 25.

PCT International Search Report—PCT/US99/14543, corresponding to U.S. Appl. No. 09/295,526.

* cited by examiner

*Primary Examiner*—Kanjibhai Patel
(74) *Attorney, Agent, or Firm*—William J. Burke

(57) ABSTRACT

Apparatus and method for classifying regions of an image, based on the relative "importance" of the various areas and to adaptively use the importance information to allocate processing resources and input image formation.

16 Claims, 5 Drawing Sheets

METHOD AND APPARATUS FOR REGION-BASED ALLOCATION OF PROCESSING RESOURCES AND CONTROL OF INPUT IMAGE FORMATION

This application is a continuation of U.S. application Ser. No. 09/295,526 filed on Apr. 21, 1999 (issued on Dec. 17, 2002 as U.S. Pat. No. 6,496,607), which claims the benefit of U.S. Provisional Application No. 60/090,813 filed Jun. 26, 1998, where both applications are herein incorporated by reference.

The invention relates generally to a system for processing images and, more particularly, to an apparatus and a concomitant method for identifying and using region(s) of interest to provide functionalities such as zooming, composition, selective input image formation and adaptive allocation of processing resources, e.g., bit allocation.

BACKGROUND OF THE INVENTION

An image sequence, such as a video image sequence, typically includes a sequence of image frames or pictures. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence undergoes image processing, e.g., compression, such that redundant information within the sequence is not stored or transmitted. Television, video conferencing and CD-ROM archiving are examples of applications, which can benefit from efficient video sequence encoding.

Additionally, in an image processing environment where processing resources are limited or constrained by the requirements of a particular application, it is necessary to carefully allocate the available resources. Namely, although many powerful image processing methods are available, some applications may not have the processing resources or a stringent requirement in low latency may exist such that more powerful image processing methods are not practical or must be sparingly and selectively applied to meet application requirements.

For example, in real-time application such as videophone or video conferencing, the talking person's face is typically one of the most important part of an image sequence. The ability to detect and exploit such regions of importance will greatly enhance an encoding system.

For example, the encoding system in a low bitrate application (e.g., real-time application) must efficiently allocate limited bits to address various demands, i.e., allocating bits to code motion information, allocating bits to code texture information, allocating bits to code shape information, allocating bits to code header information and so on. At times, it may be necessary to allocate available bits such that one parameter will benefit at the expense of another parameter, i.e., spending more bits to provide accurate motion information at the expense of spending less bits to provide texture information. Without information as to which regions in a current frame are particularly important, i.e., deserving of more bits from a limited bit pool, the encoder may not allocate the available bits in the most efficient manner.

Furthermore, although the encoder may have additional resources to dedicate to identified regions of importance, it is often still unable to improve these regions beyond the quality of the existing input image sequence. Namely, changing the encoding parameters of the encoder cannot increase the quality of the regions of importance beyond what is presented to the encoder.

Therefore, there is a need in the art for an apparatus and a concomitant method for classifying regions of interest in an image, based on the relative "importance" of the various areas and to adaptively use the importance information to allocate processing resources and to control manipulation of the input image sequence prior to encoding.

SUMMARY OF THE INVENTION

An embodiment of the present invention is an apparatus and method for classifying regions of an image as important or region(s) of interest. The parameters that contribute to such classification may initially be derived from a block classifier that detects the presence of facial blocks, edge blocks and motion blocks. Such detected blocks can be deemed as important blocks and is then collected and represented in an "importance map" or "class map".

Additionally, other parameters can be used in the generation or refinement of the importance map. Namely, a voice detector can be employed to detect and associate a voice to a speaker in the image sequence, thereby classifying the region in the image that encompasses the identified speaker as important or a region of interest. Furthermore, additional importance information may include user defined importance information, e.g., interactive inputs from a user that is viewing the decoded images.

Once the importance information is made available, the present invention allocates processing resources in accordance with the importance information. For example, more bits are allocated to "important" regions as compared to the less "important" regions; more motion processing is applied to "important" regions; coding modes are changed for "important" regions; and/or segmentation processing is refined for "important" regions as well.

In another embodiment, the formation of the input image sequence is also accomplished in accordance with the importance information. Namely, a higher resolution for the identified regions of interest is acquired from a higher quality source, e.g., directly from an NTSC signal, to form the input image sequence prior to encoding. Such input image sequence formation allows functionalities such as zooming and composition. Thus, the relative "importance" of the various areas of a frame is rapidly classified and used in resource allocation and input image formation.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
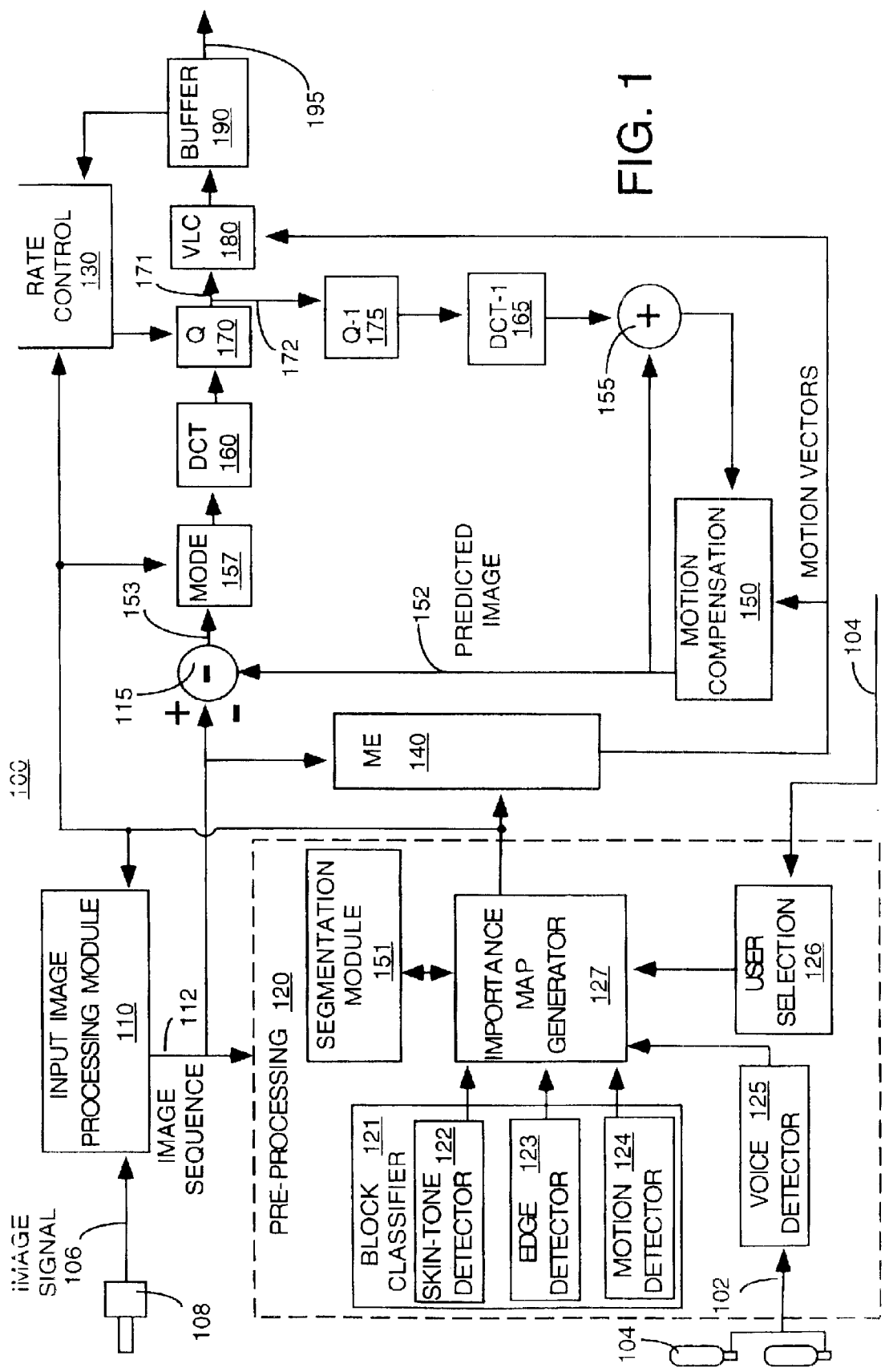
FIG. 1 illustrates a block diagram of the encoder of the present invention for classifying regions of an image, based on the relative "importance" of the various areas and to adaptively use the importance information to allocate processing resources.

FIG. 1 depicts a block diagram of the apparatus 100 of the present invention for classifying regions of an image, based on the relative "importance" of the various areas and to adaptively use the importance information to allocate processing resources and to control manipulation of the input image sequence prior to encoding. Although the preferred embodiment of the present invention is described below using an encoder, it should be understood that the present invention can be employed in image processing systems in general. Furthermore, the present invention can be employed in encoders that are in compliant with various coding standards. These standards include, but are not limited to, the Moving Picture Experts Group Standards (e.g., MPEG-1 (11172-*), MPEG-2 (13818-*) and MPEG-4), H.261 and H.263.

The apparatus 100 is an encoder or a portion of a more complex block-based motion compensated coding system. The apparatus 100 comprises a preprocessing module 120, an input image processing module 110, a motion estimation module (ME) 140, a motion compensation module 150, a mode decision module 157, a rate control module 130, a transform module, (e.g., a DCT module) 160, a quantization module 170, a coder, (e.g., a variable length coding module) 180, a buffer 190, an inverse quantization module 175, an inverse transform module (e.g., an inverse DCT module) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an image capturing device 108, e.g., a video camera, for capturing a high resolution image signal, e.g., an NTSC signal, on path 106. This high resolution image signal is typically received and subsampled by input image processing module 110 to generate an image sequence on path 112 for the encoder. Namely, in many situations, the captured image resolution is greater than the transmitted resolution to the encoder. Thus, the resulting input image (image sequence) on path 112 has been digitized and is represented as a luminance and two color difference signals (Y, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array.

It should be noted that although the following disclosure uses the MPEG standard terminology, it should be understood that the term macroblock or block is intended to describe a block of pixels of any size or shape that is used for the basis of encoding. Broadly speaking, a "macroblock" or a "block" could be as small as a single pixel, or as large as an entire video frame.

In one embodiment of the present invention, regions of interest are identified such that corresponding portions of these regions of interest in the high resolution image signal on path 106 are maintained, thereby effecting selective input image formation. For example, if a region of interest defining a human speaker is made available to the input image processing module 110, a high resolution of the speaker is maintained without subsampling and is then sent to the encoder on path 112. In this manner, each frame or picture in the image sequence may contain subsampled regions and high resolution regions. The high resolution regions can be exploited to provide zooming and composition as discussed below.

Once a high resolution region is identified and made available to the encoder, the encoder can then enhance or encode the image in any number of different approaches depending on the requirements of a specific application. For example, four possible methods of enhancing certain regions of an image can be achieved by changing the spatial resolution and/or changing the quality of the image.

In a first embodiment, the image resolution is maintained at a constant while the quality of the image is changed. Namely, the quality for region of interest (ROI) is increased, e.g., the quantizer scale is reduced, whereas the quality for non-region of interest (non-ROI) is reduced, e.g., the quantizer scale is increased. Namely, the quantizer scale can be increased to only maintain at least a very low quality version of the current frame for all other regions. Maintaining a low quality version of the current frame allows the overall system to react quickly if the region of interest is changed to another region on the current frame, i.e., allowing a low latency response in changing region of interest. In fact, in extreme situations, the encoder may only forward a subset of the transform coefficients, e.g., DC components only for the less important or unimportant regions (or non-ROI). Other parameters that affect quality of the image can also be altered as desired. The very low quality version of the current frame can then be encoded in conjunction with the identified high resolution region. Namely, a greater portion of the available coding bits are dedicated to the identified regions of interest at the expense of the other regions of the frame. Since the encoder is aware of what is important in a particular frame, it can efficiently allocate coding resources as necessary.

It should be noted that the actual composition of the high resolution region into the current frame is implemented at the discretion of the overall system. Namely, both the encoder and the decoder can be tasked with the compositing function. However, it is recognized that greater flexibility can be achieved if the compositing function is left with the decoder. As such, Table 1 below illustrates two different embodiments where: 1) the identified ROI is encoded into a composite stream in conjunction with the less important region(s) or 2) the identified ROI and the less important region(s) are encoded into two separate streams where the compositing function is left with the decoder.

In a second embodiment, the image quality is maintained at a constant while the resolution of the ROI changed. For example, only a "zoomed" version of the ROI is encoded, while the remaining portion of the image is not encoded.

In a third embodiment, a low quality and low resolution for the unimportant regions is encoded with a high quality and high resolution ROI. For example, the ROI can be composited in a low-activity region of the whole field of view and this composite image is encoded. Alternatively, the entire field of view at a low quality and/or resolution can be composited along within the high resolution region of interest window.

In a fourth embodiment, the identified ROI and the less important region(s) are encoded into two seperate streams where the compositing function is left with the decoder.

Thus, although four embodiments are described, Table 1 illustrates that many variations are possible depending on the requirement of a particular implentation.

TABLE 1

| Change? | Composite Stream | | Two Separate Streams | |
|---|---|---|---|---|
| (Res, Quality) | ROI | Non-ROI | ROI | Non-ROI |
| 1 | yes, yes | yes, yes | yes, yes | yes, yes |
| 2 | yes, yes | yes, no | yes, yes | yes, no |
| 3 | yes, yes | no, yes | yes, yes | no, yes |
| 4 | yes, yes | no, no | yes, yes | no, no |
| 5 | yes, no | yes, yes | yes, no | yes, yes |
| 6 | yes, no | yes, no | yes, no | yes, no |
| 7 | yes, no | no, yes | yes, no | no, yes |
| 8 | yes, no | no, no | yes, no | no, no |
| 9 | no, yes | yes, yes | no, yes | yes, yes |
| 10 | no, yes | yes, no | no, yes | yes, no |
| 11 | no, yes | no, yes | no, yes | no, yes |
| 12 | no, yes | no, no | no, yes | no, no |
| 13 | no, no | yes, yes | no, no | yes, yes |
| 14 | no, no | yes, no | no, no | yes, no |
| 15 | no, no | no, yes | no, no | no, yes |
| 16 | no, no | no, no | no, no | no, no |

Returning to FIG. 1, in the preferred embodiment, the digitized input image signal undergoes one or more preprocessing steps in the preprocessing module 120. More specifically, preprocessing module 120 comprises a block classifier 121, a segmentation module 151, a voice detector 125, a user selection module 126 and an importance map generator or discriminator 127. In brief, the preprocessing module 120 analyzes the input image sequence and generates an importance map which is a representation on a frame basis as to the regions on each frame that are of interest or important in accordance with a particular application. The importance map is then employed to control various encoding functions, e.g., motion estimation, coding mode decision, rate control and input image formation. A detailed description as to the generation of the importance map and its subsequent use is provided below.

Returning to FIG. 1, the input image on path 112 is also received into motion estimation module (ME) 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted. In one embodiment of the present invention, the motion estimation module 140 also receives importance information from the preprocessing module 120 to enhance the performance of the motion estimation process. For example, blocks that are classified as important may receive additional motion estimation processing, such as half-pel motion estimation.

The motion vectors from the motion estimation module 140 are received by the motion compensation module 150 for improving the efficiency of the prediction of sample values. Namely, the motion compensation module 150 uses the previously decoded frame and the motion vectors to construct an estimate (motion compensated prediction or predicted image) of the current frame on path 152. This motion compensated prediction is subtracted via subtractor 115 from the input image on path 112 in the current macroblocks to form an error signal (e) or predictive residual on path 153.

Next, the mode decision module 157 uses the predictive residuals for determining the selection of a coding mode for each macroblock. Mode decision is the process of deciding among the various coding modes made available within the confines of the syntax of the respective video encoders. Generally, these coding modes are grouped into two broad classifications, inter mode coding and intra mode coding. For example, MPEG-2 provides macroblock coding modes which include intra mode, no motion compensation mode (No MC), skipping, frame/field/dual-prime motion compensation inter modes, forward/backward/average inter modes and field/frame DCT modes. A method for selecting coding mode is disclosed in US patent application entitled "Apparatus And Method For Selecting A Rate And Distortion Based Coding Mode For A Coding System", filed Dec. 31, 1997 with Ser. No. 09/001,703, which is commonly owned by the present assignee and is herein incorporated by reference. In one embodiment, the coding mode is selected in accordance with the identified regions of interest.

The predictive residual signal is passed to a transform module, e.g., a DCT module 160 or a discrete wavelet transform (DWT). The DCT module then applies a forward discrete cosine transform process to each block of the predictive residual signal to produce a set of eight (8) by eight (8) block of DCT coefficients.

The resulting 8×8 block of DCT coefficients is received by quantization (Q) module 170, where the DCT coefficients are quantized. The process of quantization reduces the accuracy with which the DCT coefficients are represented by dividing the DCT coefficients by a set of quantization values or scales with appropriate rounding to form integer values. By quantizing the DCT coefficients with this value, many of the DCT coefficients are converted to zeros, thereby improving image compression efficiency.

Next, the resulting 8×8 block of quantized DCT coefficients is received by a coder, e.g., variable length coding module 180 via signal connection 171, where the two-dimensional block of quantized coefficients is scanned in a "zig-zag" order to convert it into a one-dimensional string of quantized DCT coefficients. Variable length coding (VLC) module 180 then encodes the string of quantized DCT coefficients and all side-information for the macroblock such as macroblock type and motion vectors into a valid data stream.

The data stream is received into a buffer, e.g., a "First In-First Out" (FIFO) buffer 190 to match the encoder output to the channel for smoothing the bitrate. Thus, the output signal on path 195 from FIFO buffer 190 is a compressed representation of the input image 110, where it is sent to a storage medium or a telecommunication channel.

The rate control module 130 serves to monitor and adjust the bitrate of the data stream entering the FIFO buffer 190 to prevent overflow and underflow on the decoder side (within a receiver or target storage device, not shown) after transmission of the data stream. In one embodiment of the present invention, the process of quantization is adjusted in accordance with the importance information received from the importance map generator 127 to effect bit allocation. Namely, quantization is an effective tool to control the encoder to match its output to a given bitrate (rate control), i.e., a higher quantization scale reduces the number of coding bits, whereas a lower quantization scale increases the number of coding bits. Since a different quantization value can be selected for each macroblock, for each sub-block or even for each individual DCT coefficient, the amount of coding bits can be tightly controlled by proper selection of the quantization scale.

Namely, in common image coding standards, changing the quantization parameter or scale, Q, controls the quality in various parts of the image. Thus, one can code different areas of the frame with different Qs in order to reflect the difference in importance of the various areas to the viewer. In the present invention, a method is presented that varies the Q across the frame such that a tight control is maintained on the bits allocated to the frame, and the Qs reflect the relative importance of the blocks. More specifically, a region of interest is provided with a smaller quantization scale whereas regions of non-interest are provided with a larger quantization scale. In essence, texture information for regions of non-interest are sacrificed as a tradeoff in providing a higher quality or resolution for the region of interest, while maintaining the bit allocation for a current frame.

Returning to FIG. 1, the resulting 8×8 block of quantized DCT coefficients from the quantization module 170 is received by the inverse quantization module 175 and the inverse transform module 165, e.g., an inverse DCT module, via signal connection 172. In brief, at this stage, the encoder regenerates I-frames and P-frames of the image sequence by decoding the data so that they are used as reference frames for subsequent encoding.

The block classifier 121 classifies the relative importance of blocks within a frame using a plurality of detectors, e.g., a skin-tone detector 122, an edge detector 123, and a motion detector 124. An example of such a block classifier is disclosed in U.S. patent application Ser. No. 09/295,878, entitled "Method And Apparatus For Block Classification And Adaptive Bit Allocation", which is filed simultaneously herewith and incorporated by reference. The block classifier 121 is used to quickly classify areas (e.g., blocks) as regions of importance or regions of interest.

In turn, the detected blocks are provided to the importance map generator 127 for generating an "importance map" or "class map". The "importance map" is a representation on a frame basis as to the regions on each frame that are of interest in accordance with a particular application. In turn, the importance map can be used to improve various image processing functions and to implement input image formation as discussed above.

In one embodiment, the importance map generator 127 receives inputs from voice detector 125. The voice detector 125 is coupled to one or more microphones 104 for detecting an audio signal. The microphones can be spatially offset such that a speaker in an image can be identified in accordance with the audio signal of the speaker being detected at a particular microphone. Using videophone as an example, the importance map generator 127 may initially identify all human faces as regions of interest prior to the start of a conference call. As the conference call begins, the person speaking in the image sequence will be detected by the voice detector 125. This information is provided to the importance map generator 127 which can then correlate the detected audio signal to a human face as detected by skin-tone detector 122. The importance map is then refined accordingly, e.g., the current speaker is then classified as a region of interest, whereas other non-speaking individuals are no longer classified as regions of interest. Alternatively, a range of importance or significance values, representative of the degree of interest of a particular region, can be assigned accordingly.

In another embodiment, the importance map generator 127 receives inputs from a user selection module 126 for identifying blocks that are predefined by a user as important. For example, the user may have prior knowledge as to the content of the image sequence such that some regions of the image sequence can be predetermined as important. For example, if a chart is intended to be illustrated in a videophone conference, the encoder can be informed that the object encompassing the chart should be treated as important and processing resources should be allocated accordingly.

Alternatively, the user selection module 126 may receive inputs on path 104 from the decoder. In this embodiment, the viewer at the decoder may interactively define the region of interest. For example, a viewer at the decoder end may wish to see a non-speaking individual more clearly than a current speaker or a viewer may request a zoom function to zoom in on a particular region in the image. This interactive function allows the decoder to adaptively zoom or composite the image. Without this function, the zooming and compositing ability of the decoder is more limited, since the decoder only has access to the encoded data, which is generated without any inputs from the decoder. By allowing the decoder to have access to the importance map generator, a viewer at the decoder end can now control to some degree as to the content of the encoded data to suit the need of a viewer.

A segmentation module 151 for segmenting or distinguishing objects within each frame is also provided in pre-processing module 120. In operation, the segmentation module 151 may optionally apply the "importance map" to implement or refine its segmentation method. Namely, the "importance map" may contain the location of facial information, edges of objects, and motion information, which can greatly reduce the computational overhead of the segmentation method by revealing information that would assist the segmentation module in segmenting a frame into one or more logical objects. For example, segmenting each object in the frame having a facial information of a particular size, and so on. Alternatively, an object can be segmented based upon interactive input from a user, e.g., segmenting a chart as a separate object from a much larger object, e.g., a background.

Finally, pre-processing section 120 also comprises a map generator or discriminator 127 for generating the importance map. Map generator 127 receives block classification related information from block classifier 121, voice detector 125 and user selection module 126 and then generates an overall importance map. In one embodiment, the various inputs from the detectors are weighed as shown in Table 2.

TABLE 2

| Skin-tone, Edge, or Motion Block? | Voice Detected? | User Selection? | Significance Value (SV) |
|---|---|---|---|
| Yes | Yes | Yes | 1.0 |
| Yes | Yes | No | 0.8 |
| Yes | No | Yes | 0.8 |
| Yes | No | No | 0.8 |
| No | Yes | Yes | 0.8 |
| No | Yes | No | 0.8 |
| No | No | Yes | 0.8 |
| No | No | No | 0.6 |

It should be noted that depending on a particular application, any combination of the above detectors can be employed. As such, the significance value assignment scheme as discussed above is provided as an example.

Figure 2:
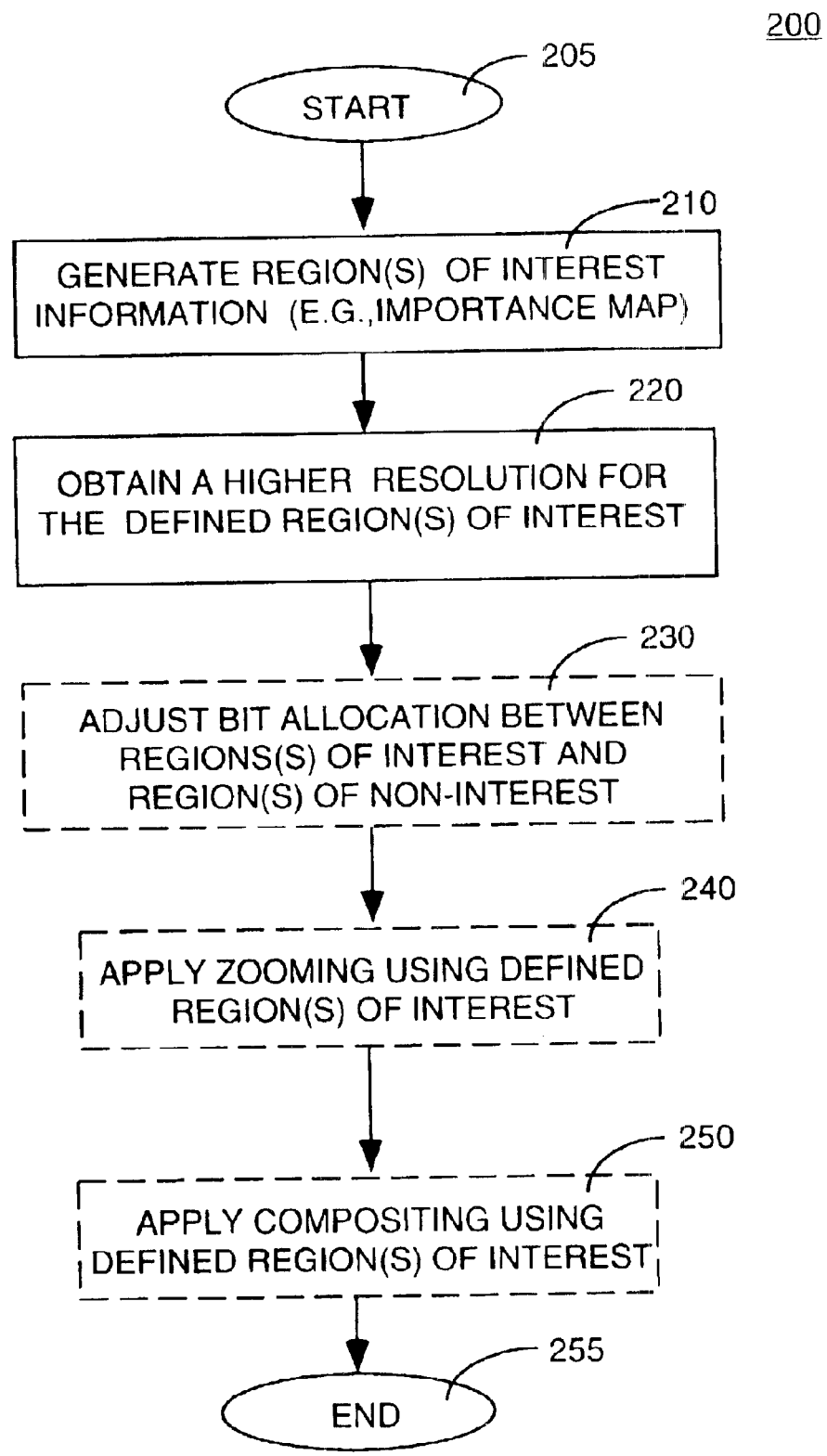
FIG. 2 illustrates a flowchart of a method for applying importance information to effect input image formation.
Figure 3:
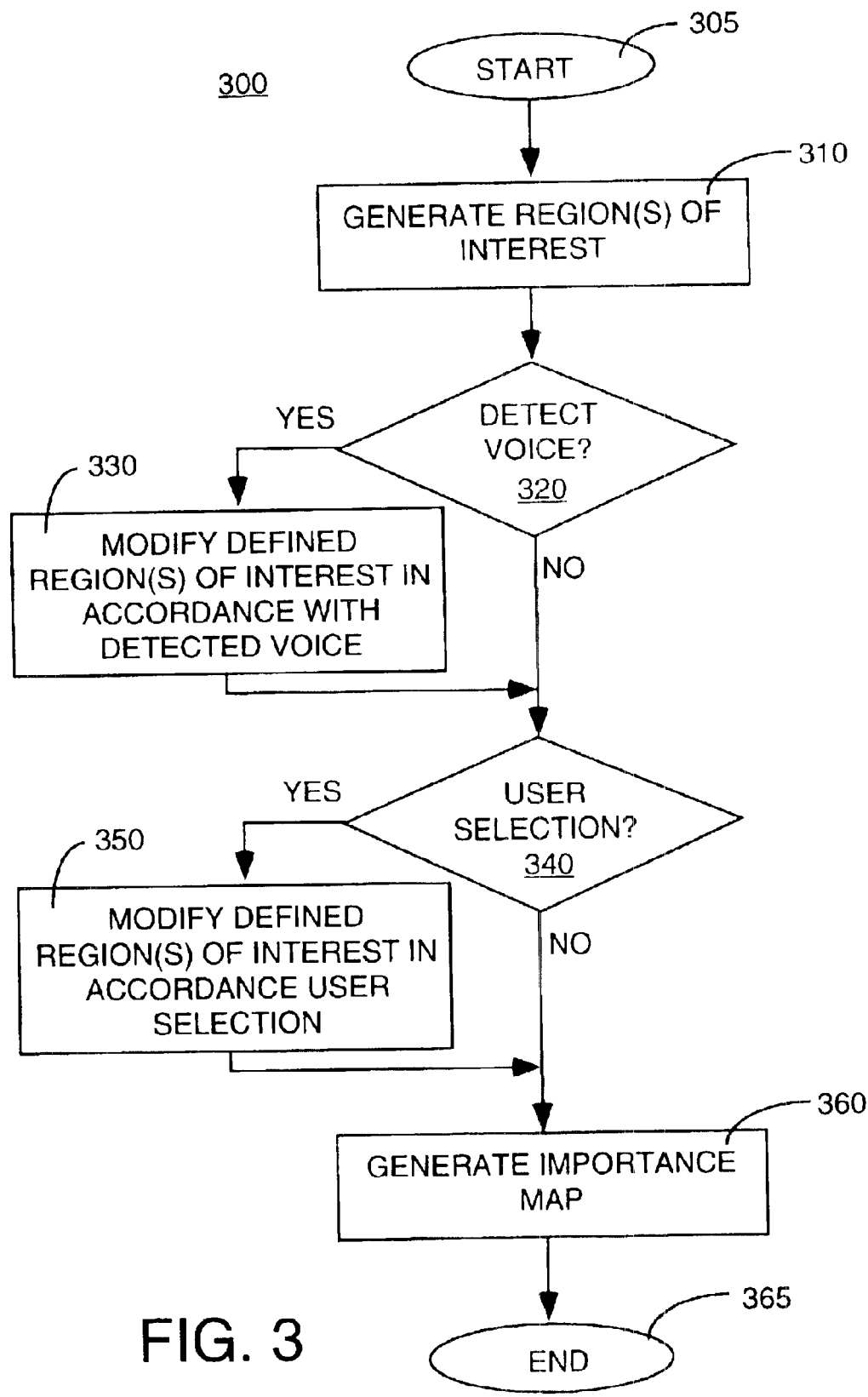
FIG. 3 illustrates a flowchart of a method for determining an importance map.

FIG. 2 illustrates a flowchart of a method 200 for applying importance information to effect input image formation. Method 200 starts in step 205 and proceeds to step 210, where method 200 generates region(s) of interest information, i.e., generated by importance map generator 127 as illustrated in FIG. 3 below.

In step 220, method 200 obtains a higher resolution for the identified region(s) of interest, e.g., directly from an image capturing device without subsampling. It should be noted that both a high resolution and a lower resolution can be obtained for the identified region(s) of interest, as required by a particular application, e.g., to implement functions such as compositing.

In step 230, once input image formation has been implemented, method 200 may optionally alter the bit allocation in accordance with the newly formed input image. For example, the region of interest carrying a higher resolution will receive additional coding bits, if necessary, at the expense of regions of non-interest.

In step 240, once input image formation has been implemented, method 200 may optionally apply zooming using the newly formed input image. For example, the region of interest carrying the higher resolution region can be used to provide zooming for that region.

In step 250, once input image formation has been implemented, method 200 may optionally apply compositing using the newly formed input image. For example, the region of interest carrying the higher resolution region can be displayed in conjunction with lower resolution regions, e.g., as in a picture-in-picture feature. Method 200 then ends in step 255.

FIG. 3 illustrates a flowchart of a method 300 for determining an importance map. Method 300 starts in step 305 and proceeds to step 310, where method 300 generates region(s) of interest information in accordance with inputs provided by block classifier 121.

In step 320, method 300 queries whether a voice has been detected, e.g., by voice detector 125. If the query is negatively answered, then method 300 proceeds to step 340. If the query is positively answered, then method 300 proceeds to step 330, where the region(s) of interest is modified in accordance with the detected voice.

In step 340, method 300 queries whether a user selection has been detected, e.g., by user selection module 126. If the query is negatively answered, then method 300 proceeds to step 360, where the importance map is generated. If the query is positively answered, then method 300 proceeds to step 350, where the region(s) of interest is modified in accordance with the user selection. Method 300 ends in step 365.

Figure 4:
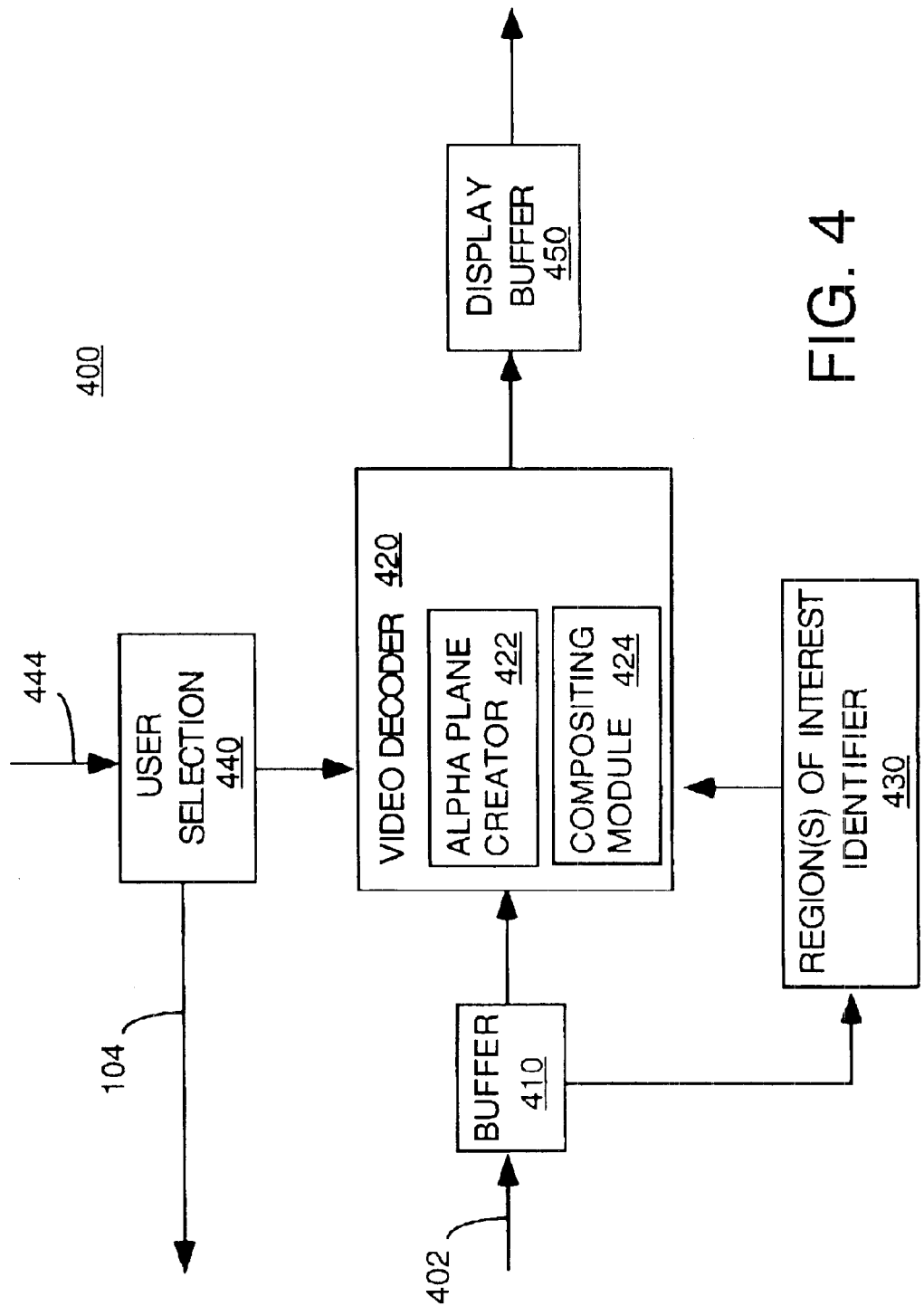
FIG. 4 illustrates a block diagram of a decoder of the present invention.

FIG. 4 illustrates a block diagram of a decoding system 400 of the present invention. The decoding system 400 comprises a buffer 410, a video decoder 420, a region(s) of interest identifier 430, a user selection module 440, and a display buffer 450.

In operation, an encoded bitstream is received into buffer 410 from a communication channel. The encoded bitstream is sent to both the video decoder 420 for decoding the encoded images and the region(s) of interest identifier 430 for identifying the regions of interest for each frame in the decoded image sequence. The identified regions of interest allow the video decoder 420 to implement a number of functions such as zooming and compositing as discussed above.

The video decoder 420 is illustrated as having an alpha plane creator 422 and a composting module 424. Namely, the alpha plane creator 422 is able to exploit information relating to shape encoding, e.g., binary shape encoding information, to quickly formulate the locations of various objects. In turn, the compositing module 424 can composite one or more regions having different resolutions into a single image frame, e.g., picture-in-picture.

The user selection module 440 is capable of receiving user input on path 444 to effect interactive control in the generation of the importance map in the encoder via communication path 104. For example, a viewer at the decoder may request a higher resolution of an object in the image. The request is sent to the encoder via path 104 and a higher resolution of that object is, in turn, received on path 402. The video decoder 420 is then able to implement a zooming or compositing function. Finally, the decoded image is sent to the display buffer 450 to be displayed.

Figure 5:
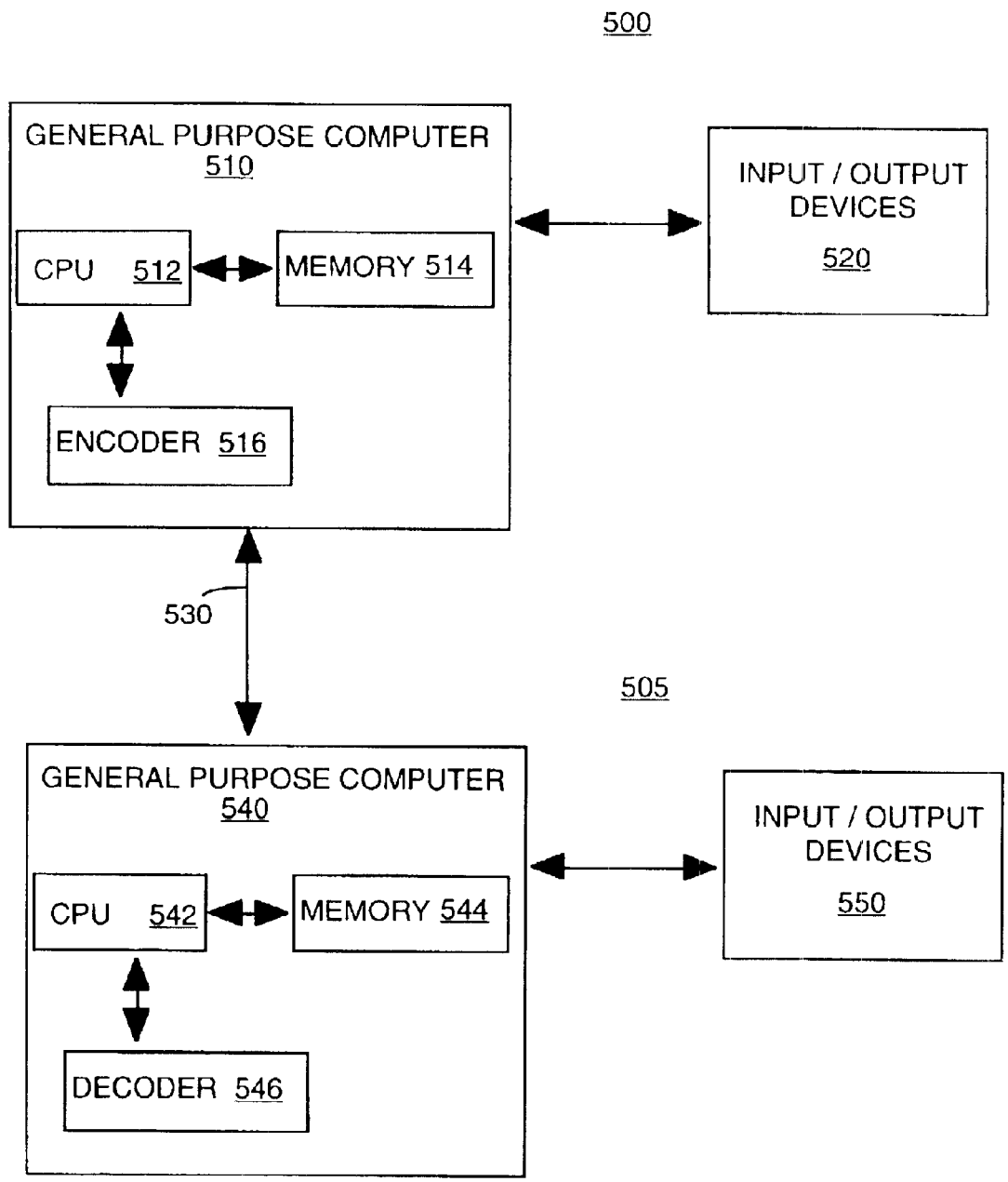
FIG. 5 illustrates an encoding system and a decoding system of the present invention.

FIG. 5 illustrates an encoding system 500 and a decoding system 505 of the present invention. The encoding system comprises a general purpose computer 510 and various input/output devices 520. The general purpose computer comprises a central processing unit (CPU) 512, a memory 514 and an encoder 516 for receiving and encoding a sequence of images.

In the preferred embodiment, the encoder 516 is simply the encoder 100 as discussed above. The encoder 516 can be a physical device which is coupled to the CPU 512 through a communication channel. Alternatively, the encoder 516 can be represented by a software application which is loaded from a storage device, e.g., a magnetic or optical disk, and resides in the memory 514 of the computer. As such, the encoder 100 of the present invention can be stored on a computer readable medium.

The computer 510 can be coupled to a plurality of input and output devices 520, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 530 is shown where the encoded signal from the encoding system is forwarded to a decoding system 505.

The decoding system 505 comprises a general purpose computer 540 and various input/output devices 550. The general purpose computer comprises a central processing unit (CPU) 542, a memory 544 and a decoder 546 for receiving and decoding a sequence of images.

In the preferred embodiment, the decoder 546 is simply the decoder 400 as discussed above. The decoder 546 can be a physical device which is coupled to the CPU 542 through a communication channel. Alternatively, the decoder 546 can be represented by a software application which is loaded from a storage device, e.g., a magnetic or optical disk, and resides in the memory 544 of the computer. As such, the decoder 400 of the present invention can be stored on a computer readable medium.

The computer 540 can be coupled to a plurality of input and output devices 550, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the decoded video bitstreams or to display the sequence of decoded video images from a storage device.

Although various embodiments which incorporate the teachings of the present invention have been shown and described in detail herein, those skilled in the art can readily devise many other varied embodiments that still incorporate these teachings.

What is claimed is:

1. A method for forming an input image sequence, said method comprising the steps of:
   (a) defining a region of interest, wherein said region of interest is defined in accordance with a detected audio signal;
   (b) obtaining a higher resolution of said defined region of interest to form a component of the input image sequence prior to an encoding operation; and
   (c) applying said input image sequence to an encoder.

2. The method of claim 1, further comprising the step of:
   (d) applying said higher resolution of said defined region of interest to implement a zooming function.

3. The method of claim 1, further comprising the step of:
   (d) applying said higher resolution of said defined region of interest to implement a compositing function.

4. The method of claim 1, further comprising the step of:
   (d) defining a non-region of interest; and
   (e) encoding said non-region of interest at a lower quality.

5. The method of claim 4, wherein said region of interest and said non-region of interest are encoded into two separate streams.

6. The method of claim 1, further comprising the step of:
   (d) encoding said region of interest at a different quality.

7. The method of claim 1, further comprising the step of:
   (d) changing a resolution of the input image sequence to account for said defined region of interest.

8. The method of claim 1, further comprising the step of:
   (d) changing a quality of the input image sequence to account for said defined region of interest.

9. A computer-readable medium having stored thereon a plurality of instructions, the plurality of instructions including instructions which, when executed by a processor, cause the processor to perform the steps comprising of:
   (a) defining a region of interest, wherein said region of interest is defined in accordance with a detected audio signal;
   (b) obtaining a higher resolution of said defined region of interest to form a component of the input image sequence to an encoding operation; and
   (c) applying said input image sequence to an encoder.

10. The computer-readable medium of claim 9, further comprising the step of:
    (d) applying said higher resolution of said defined region of interest to implement a zooming function.

11. The computer-readable medium of claim 9, further comprising the step of:
    (d) applying said higher resolution of said defined region of interest to implement a compositing function.

12. The computer-readable medium of claim 9, further comprising the steps of:
    (d) defining a non-region of interest; and
    (e) encoding said non-region of interest at a lower quality.

13. The computer-readable medium of claim 9, further comprising the step of:
    (d) encoding said region of interest at a different quality.

14. The computer-readable medium of claim 9, further comprising the step of:
    (d) changing a resolution of the input image sequence to account for said defined region of interest.

15. The computer-readable medium of claim 9, further comprising the step of:
    (d) changing a quality of the input image sequence to account for said defined region of interest.

16. An apparatus for forming an input image sequence, said apparatus comprising:
    an importance map generator for defining a region of interest, wherein said region of interest is defined in accordance with a detected audio signal;
    an image capturing device for obtaining a higher resolution of said defined region of interest to form a component of the input image sequence prior to an encoding operation; and
    an input image processing module, coupled to said importance map generator and said image capturing device, for applying said input image sequence to an encoder.

* * * * *